(12) United States Patent
Gorny et al.

(10) Patent No.: US 11,456,981 B2
(45) Date of Patent: Sep. 27, 2022

(54) SYSTEM AND METHOD FOR CAPTURING, STORING, AND TRANSMITTING PRESENTATIONS

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

(21) Appl. No.: 16/836,254

(22) Filed: Mar. 31, 2020

(65) Prior Publication Data
US 2020/0366630 A1    Nov. 19, 2020

Related U.S. Application Data
(60) Provisional application No. 62/848,162, filed on May 15, 2019.

(51) Int. Cl.
*G06F 40/169* (2020.01)
*H04L 51/10* (2022.01)

(52) U.S. Cl.
CPC ............ *H04L 51/10* (2013.01); *G06F 40/169* (2020.01)

(58) Field of Classification Search
CPC ............................... H04L 51/10; G06F 40/169
See application file for complete search history.

(56) References Cited

U.S. PATENT DOCUMENTS

| 7,567,987 | B2 | 7/2009 | Shappell et al. |
| 7,689,898 | B2 | 3/2010 | Merril et al. |
| 8,984,390 | B2 | 3/2015 | Aymeloglu et al. |
| 9,269,072 | B2 | 2/2016 | Mexandrov et al. |
| 9,495,663 | B2 | 11/2016 | Ramaswamy et al. |
| 2005/0043060 | A1 | 2/2005 | Brandenberg et al. |

(Continued)

OTHER PUBLICATIONS

International Search Report for Application No. PCT/US2020/032924 dated Jul. 31, 2020. 2 Pages.

(Continued)

*Primary Examiner* — Kyle R Stork
(74) *Attorney, Agent, or Firm* — Spencer Fane LLP; Steven J. Laureanti

(57) ABSTRACT

A system and method are disclosed for generating a presentation space for two or more communication devices using a computer coupled with a database and comprising a processor and memory. The computer generates a presentation space and transmits requests to join the presentation space to the two or more communication devices. The computer stores in memory identification information for each of the two or more communication devices. The computer transmits the presentation space to the two or more communication devices and detects chat messages transmitted between the two or more communication devices. The computer also detects screenshot capture commands transmitted by one of the two or more communication devices to the computer. The computer records one or more screenshots in response to the screenshot capture commands and displays one or more screenshots in the presentation space.

17 Claims, 4 Drawing Sheets

(56) References Cited

U.S. PATENT DOCUMENTS

| | | | | |
|---|---|---|---|---|
| 2010/0070842 A1* | 3/2010 | Aymeloglu | ............ | G06F 3/0482 715/207 |
| 2011/0246925 A1* | 10/2011 | Marchand | ............ | G06Q 10/067 715/772 |
| 2012/0166952 A1* | 6/2012 | Alexandrov | ......... | G06Q 10/101 715/730 |
| 2012/0185291 A1* | 7/2012 | Ramaswamy | ..... | G06Q 10/1095 705/7.19 |
| 2012/0317052 A1* | 12/2012 | Heyner | .................. | G06Q 40/06 705/36 R |
| 2015/0026098 A1* | 1/2015 | Ramos | ................... | G06Q 40/06 705/36 R |
| 2015/0365582 A1* | 12/2015 | Eramian | ............ | H04N 5/23206 348/159 |
| 2016/0147645 A1* | 5/2016 | Kandpal | ............. | G06F 11/3688 717/124 |
| 2018/0081744 A1* | 3/2018 | Chen | ....................... | G06F 9/544 |

OTHER PUBLICATIONS

Guay. "Screenshot Tools, Tips, and Shortcuts: How to Capture Anything on Your Screen." In: Zapier. Aug. 8, 2018 (Aug. 8, 2018) Retrieved o Jul. 7, 2020 (Jul. 7, 2020) from <httpss:zapier.com/blog/best-screen.capture-tool/> entire document.

* cited by examiner

SYSTEM AND METHOD FOR CAPTURING, STORING, AND TRANSMITTING PRESENTATIONS

CROSS-REFERENCE TO RELATED APPLICATIONS

The present disclosure is related to that disclosed in the U.S. Provisional Application No. 62/848,162, filed May 15, 2019, entitled "System and Method for Capturing, Storing, and Transmitting Presentation Images." U.S. Provisional Application No. 62/848,162 is assigned to the assignee of the present application. The subject matter disclosed in U.S. Provisional Application No. 62/848,162 is hereby incorporated by reference into the present disclosure as if fully set forth herein. The present invention hereby claims priority under 35 U.S.C. § 119(e) to U.S. Provisional Application No. 62/848,162.

TECHNICAL FIELD

The present disclosure relates generally to electronic presentation systems and more specifically to systems and methods to capture, store, and transmit images captured during presentations.

BACKGROUND

Presentation systems may utilize communication networks, including but not limited to the internet, to connect communication systems such as computers, tablet computers, and/or smartphones. Presentation systems may permit communication systems to share visual imagery and audio data associated with a speaking user with other communication systems. However, connecting to and configuring presentation spaces, and capturing and sharing images of presentation spaces between communication systems, may require complex and convoluted setup and sharing actions, which is undesirable.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to capture, store, and transmit presentation images. Embodiments of the disclosed subject matter include two or more communication devices, including but not limited to tablet computers or smartphones, and a computer coupled with a database and comprising a processor and memory. The computer generates a presentation space and transmits requests to join the presentation space to the two or more communication devices. The computer stores in memory identification information for each of the two or more communication devices. The computer transmits the presentation space to the two or more communication devices. The presentation space may include visual and audio components, such as but not limited to live imagery of an in-process presentation, and a chat component, which the communication devices may use to transmit text messages to other communication devices during the presentation.

In embodiments of the disclosed subject matter, the computer detects chat messages transmitted between the two or more communication devices. The computer also detects screenshot capture commands transmitted by one of the two or more communication devices to the computer. The computer records one or more screenshots in response to the screenshot capture commands and displays one or more screenshots in the presentation space.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
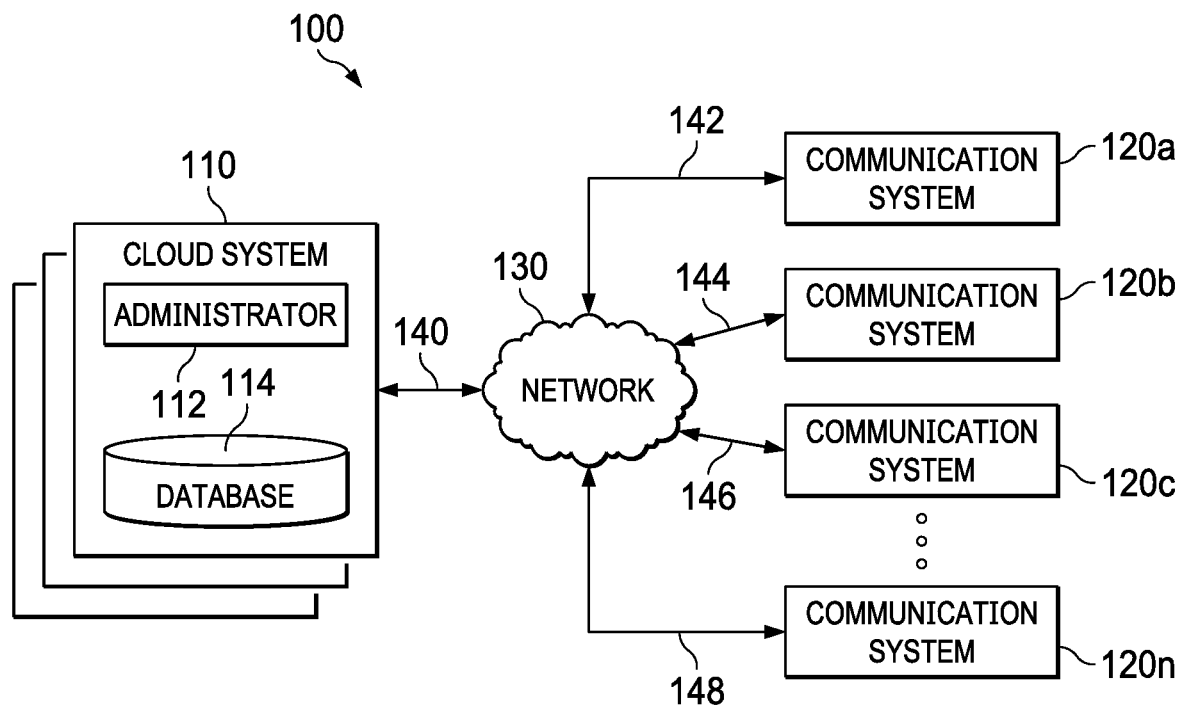
FIG. 1 illustrates an exemplary presentation system, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, aspects of the following disclosure relate to a presentation system and method to capture, store, and transmit screen images taken during electronic presentations automatically. Embodiments of the following disclosure generate a presentation space, which a plurality of communication systems, each controlled by an individual or group of users, may join. Embodiments of the presentation space comprise a video component, which may include live video imagery or presentation slides (such as, for example, a Microsoft PowerPoint presentation deck), an audio component which may comprise live audio from a speaking presenter, and a chat component, which allows communication system participants to message one another during the presentation. Embodiments permit one or more participants to capture screenshot images of the presentation space's current state and automatically share these images with all communication system participants in the presentation space chat.

Embodiments of the following disclosure enable the capture, storage, transmission, and sharing of multiple screenshot images captured during electronic presentations, facilitated by a single user action. Embodiments may permit one or more communication systems to efficiently create and manage one or more presentation spaces, and to easily invite other communication systems to participate in particular presentation spaces. Embodiments may also store screenshot images from one or more presentation images for viewing at a later time.

FIG. 1 illustrates exemplary presentation system 100, according to a first embodiment. Presentation system 100 comprises one or more cloud systems 110, one or more communication systems 120, network 130, and communication links 140-148. Although one or more cloud systems 110, communication systems 120a-120n, single network 130, and communication links 140-148 are shown and described, embodiments contemplate any number of cloud systems 110, communication systems 120, networks 130, or communication links 140-148, according to particular needs.

In one embodiment, cloud system 110 comprises administrator 112 and database 114. Administrator 112 is programmed to generate a presentation space in which one or more communication systems 120 may participate. According to embodiments, administrator 112 captures screenshot images of communication system 120 communications within the presentation space and shares the captured screenshot images with one or more communication systems 120. Database 114 comprises one or more databases 114 or other data storage arrangements at one or more locations local to, or remote from, cloud system 110. In one embodiment, one or more databases 114 is coupled with one or more administrators 112 using one or more local area networks (LANs), metropolitan area networks (MANs), wide area networks (WANs), or aforementioned network 130, such as, for example, the Internet, or any other appropriate wire line, wireless link, or any other communication links. One or more databases 114 stores data that is made available to and may be used by one or more administrators 112 according to the operation of presentation system 100 described below. According to embodiments, administrator 112 hosts and runs one or more runtime processes associated with cloud system 110.

According to embodiments, each of one or more communication systems 120 comprises one or more users such as, for example, an individual person or customer, one or more employees or teams of employees within a business, or any other individual, person, group of persons, business, or enterprise which communicates or otherwise interacts with one or more separate communication systems 120. Although an exemplary number of communication systems 120a-120n are shown and described, embodiments contemplate any number of communication systems 120 interacting with network 130 and one or more cloud systems 110 according to particular needs.

Each communication system 120 comprises one or more communication devices, such as, for example, cellular phones or smartphones, desktop computers, laptop computers, notebook computers, tablet-type devices, terminals, or any other communication device capable of receiving, transmitting, and displaying audiovisual information through network 130. In an embodiment, each of one or more communication devices may comprise a device containing an audiovisual recording device, such as a computer camera and microphone, and an audiovisual display device, such as an electronic display screen and one or more speakers, which may permit each of one or more users interacting with each communication device to see and hear the visual and audio components of the presentation space, and to transmit audiovisual information to cloud system 110 or to other communication systems 120, using network 130 and communication links 140-148.

Each communication system 120 may comprise a processor, memory and data storage. The processor may execute an operating system program stored in memory to control the overall operation of one or more communication devices associated with each of one or more communication systems 120. For example, the processor may control the reception of signals and the transmission of signals within presentation system 100. The processor may execute other processes and programs resident in memory, such as, for example, registration, identification or communication over the communication links 140-148, and moving data into or out of the memory, as required by an executing process.

Each communication system 120 and one or more communication devices that comprise each communication system 120 may be coupled with other communication systems 120, as well as one or more cloud systems 110, by network 130 via communication links 142-148. Although communication links 142-148 are shown connecting each of one or more communication systems 120, respectively, to network 130, embodiments contemplate any number of communication links 142-148 connecting any number of communication systems 120 with network 130, according to particular needs. In alternative embodiments, communication links 142-148 may connect one or more communication systems 120 directly to one or more cloud systems 110 and/or one or more separate communication systems 120 and/or communication devices.

According to embodiments, one or more communication links 140-148 couple one or more cloud systems 110, including its administrator and database, and one or more communication systems 120 with network 130. Each communication link 140-148 may comprise any wireline, wireless, or other link suitable to support data communications between one or more cloud systems 110 and/or one or more communication systems 120 and network 130. Although communication links 140-148 are shown as generally coupling one or more cloud systems 110 and one or more communication systems 120 with network 130, one or more cloud systems 110 and one or more communication systems 120 may communicate directly with each other according to particular needs.

According to embodiments, network 130 includes the Internet, telephone lines, any appropriate LANs, MANs, or WANs, and any other communication network coupling one or more cloud systems 110 and one or more communication systems 120. For example, data may be maintained by one or more cloud systems 110 at one or more locations external to one or more cloud systems 110, and made available to one or more cloud systems 110 or one or more communication systems 120 using network 130, or in any other appropriate manner.

According to embodiments, one or more cloud systems 110 and/or one or more communication systems 120 may each operate on one or more computers that are integral to or separate from the hardware and/or software that supports presentation system 100. In addition, or as an alternative, one or more users may be associated with presentation system 100 including one or more cloud systems 110 and/or one or more communication systems 120. These one or more users may include, for example, one or more computers programmed to autonomously generate a presentation space and to store and transmit captured presentation space images between one or more participating communication systems 120. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of presentation system 100, including digital or analog data, visual information, or audio information. Furthermore, one or more computers include any suitable fixed or removable non-transitory computer-readable storage media, such as magnetic computer disks, CD-ROMs, or other suitable media to receive output from and provide input to presentation system 100. One or more computers also include one or more processors and associated memory to execute instructions and manipulate information according to the operation of presentation system 100.

Embodiments contemplate one or more cloud systems 110 generating a presentation space. Each of one or more communication systems 120 may connect to one or more cloud systems 110 using network 130 and communication links 140-148, and may participate in the presentation space. The presentation space may allow one or more users associated with each of one or more communication systems 120 to conduct and participate in an audiovisual presentation or meeting using the communication devices. The presentation space may comprise a visual component, an audio component, and/or a chat component. The visual component may comprise live video imagery of a speaking user or a prerecorded video, or may comprise presentation imagery, such as a series of presentation slides (such as a Microsoft PowerPoint presentation deck) or a prerecorded video. The audio component may comprise live audio, such as audio from one or more currently-speaking users associated with communication system 120, or previously-recorded audio such as spoken audio, a podcast, music, or audio from a prerecorded video. One or more cloud systems 110 may coordinate the transmission of the presentation space visual and audio components to one or more communication systems 120 using network 130 and communication links 140-148. One or more cloud systems 110 may instruct one or more communication systems 120 to display the presentation space visual and audio components, using the audiovisual display devices of communication system 120 communication devices, to one or more users associated with each of one or more communication systems 120 in the form of presentation display 502, best illustrated by FIG. 5.

The presentation space chat component may comprise a chat interface. The chat interface permits each of one or more communication systems 120, and one or more users associated with each of one or more communication systems 120, to send and receive text-based messages and images to other communication systems 120 participating in the chat interface. One or more cloud systems 110 may instruct one or more communication systems 120 to display the presentation space chat component and chat interface to one or more users associated with each of one or more communication systems 120 in the form of chat display 602, best illustrated by FIG. 6, displayed on the audiovisual display devices of one or more communication systems 120.

According to embodiments and as described in greater detail below, one or more cloud systems 110 enable one or more communication devices to capture screenshot images of the visual component of the presentation space, i.e. presentation display 502, or of the chat component, i.e. chat display 602. One or more cloud systems 110 may then automatically post the captured image to the chat component of the presentation space, such as in the chat interface where the image will be visible to all other participating communication systems 120. One or more cloud systems 110 may store one or more captured screenshot images in one or more databases 114 associated with presentation system 100, such as one or more cloud system databases 114.

Figure 2:
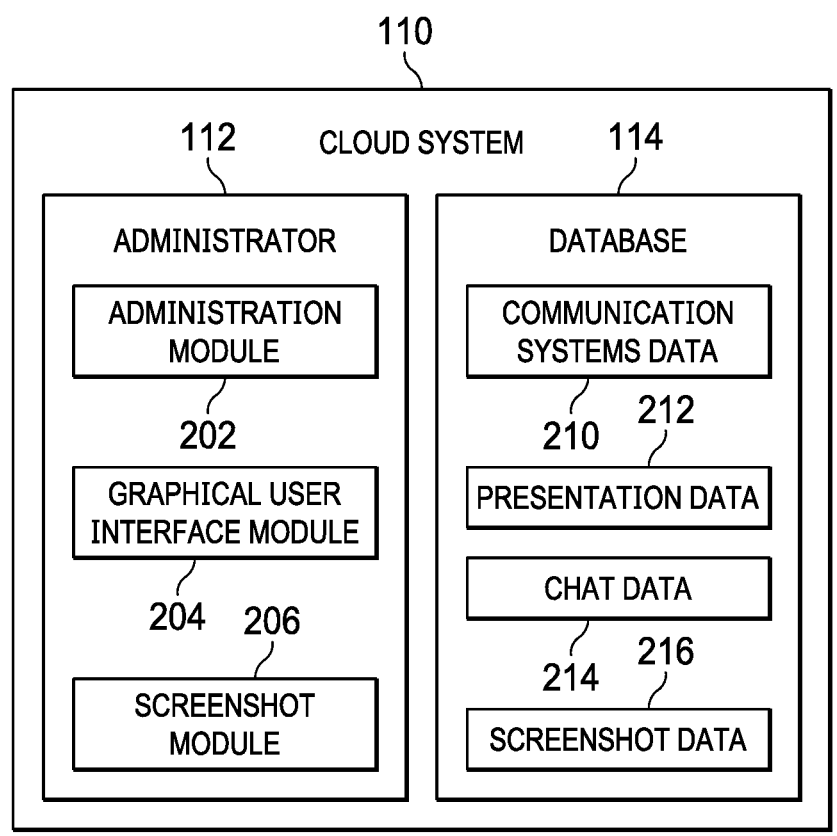
FIG. 2 illustrates the cloud system of FIG. 1 in greater detail, according to an embodiment.

FIG. 2 illustrates cloud system 110 of FIG. 1 in greater detail, according to an embodiment. As discussed above, cloud system 110 may comprise one or more computers at one or more locations including associated input devices, output devices, non-transitory computer-readable storage media, processors, memory, or other components to send and receive information between one or more communication systems 120 according to the operation of presentation system 100. In addition, cloud system 110 comprises administrator 112 and database 114. Although cloud system 110 is described as comprising single administrator 112 and database 114, embodiments contemplate any suitable number of administrators 112 or databases 114 internal to or externally coupled with cloud system 110. In addition, or as an alternative, cloud system 110 may be located internal to one or more communication systems 120. For example, in an embodiment in which one of communication systems 120 is a computer, the computer may also function as cloud system 110 and may generate the presentation space for other participating communication systems 120. In other embodiments, cloud system 110 may be located external to one or more communication systems 120 and may be located in, for example, a corporate or regional entity of one or more communication systems 120, according to particular needs.

According to embodiments, administrator 112 comprises administration module 202, graphical user interface module 204, and screenshot module 206. Although a particular configuration of administrator 112 is shown and described, embodiments contemplate any suitable number or combination of administration modules 202, graphical user interface modules 204, and screenshot modules 206, located at one or more locations, local to, or remote from, cloud system 110, according to particular needs. In addition, or as an alternative, administration module 202, graphical user interface module 204, and screenshot module 206 may be located on multiple administrators 112 or computers at any location in presentation system 100.

Database 114 comprises communication systems data 210, presentation data 212, chat data 214, and screenshot data 216. Although database 114 is shown and described as comprising communication systems data 210, presentation data 212, chat data 214, and screenshot data 216, embodiments contemplate any suitable number or combination of communication systems data 210, presentation data 212, chat data 214, screenshot data 216, and/or other data pertaining to presentation system 100 located at one or more locations, local to, or remote from, cloud system 110, according to particular needs.

Communication systems data 210 of database 114 comprises the identification information of one or more communication systems 120, such as, for example, names and addresses of one or more users associated with each of one or more communication systems 120, company contact information, telephone numbers, email addresses, IP addresses, and the like. According to embodiments, identification information may also comprise information associated with the operating systems of each of one or more communication systems 120, internet browser information regarding each of one or more communication devices associated with each of one or more communication systems 120, or system specifications (such as, for example, processor speed, available memory, hard drive space, and the like) for each of one or more communication devices associated with each of one or more communication systems 120.

Communication systems data 210 may also include end user ID information, communication system ID information, communication system MAC address information, or any other type of information which cloud system 110 may use to identify and track each of one or more communication systems 120 participating in presentation system 100. Communication systems data 210 may further comprise identification data which identifies and tracks each of one or more communication devices which comprise each of one or more communication systems 120. Although certain particular communication systems data 210 are described, embodiments contemplate any type of communication systems data 210 associated with one or more communication systems 120 or communication devices, according to particular needs. In one embodiment, cloud system 110 uses communication systems data 210 to identify one or more participating communication systems 120 in presentation system 100 in order to generate particular configurations of presentation system 100 specific to each communication system. In another embodiment, cloud system 110 uses communication systems data 210 to generate a presentation space which specifically includes only certain identified communication systems 120, such as in the case of a private presentation space.

Presentation data 212 of database 114 may comprise information regarding the presentation space, including information pertaining to the visual and audio components of the presentation space. More specifically, presentation data 212 may include stored data files comprising the presentation imagery, such as a presentation slide deck or a prerecorded video, which may comprise the visual component of the presentation space. Presentation data 212 may also include stored data files comprising presentation audio, such as a recorded audio presentation, a podcast, music, or audio from a prerecorded video, which may comprise the audio component of the presentation space. Although particular examples of presentation data 212 are described herein, embodiments contemplate any type of presentation data 212 associated with one or more cloud systems 110 and/or communication devices, according to particular needs.

According to embodiments, presentation data 212 may comprise live visual imagery and audio of a speaking user, which cloud system 110 transmits to one or more communication systems 120 in presentation system 100 using network 130 and communication links 140-148. This live imagery and audio may be recorded by a particular communication system participating in the presentation space and transmitted from that communication system to cloud system 110, which may then transmit the live imagery and audio to one or more separate communication systems 120 participating in the presentation space. Cloud system 110 may store a recording of the live imagery and audio in presentation data 212, which one or more cloud systems 110 and/or one or more communication systems 120 may access at a later time.

Chat data 214 of database 114 comprises information regarding the chat component of the presentation space. Chat data 214 may comprise information, including text messages, images, files, links, emojis, and the like (collectively, a "chat message"), transmitted between communication systems 120 participating in the presentation space. Cloud system 110 may store a transcript of the chat interface and the chat messages transmitted between communication systems 120 in one or more databases 114 associated with presentation system 100. One or more cloud systems 110 and/or one or more communication systems 120 may access this chat transcript at a later time.

Screenshot data 216 of database 114 comprises captured images of the visual component of the presentation space, and may store each captured image in one or more databases 114 associated with presentation system 100. One or more cloud systems 110 and/or one or more communication systems 120 may access the captured images stored in screenshot data 216 at a later time.

Administration module 202 of administrator 112 may configure, update, and/or manage the operation of cloud system 110. That is, administration module 202 may configure, update, and/or manage the broader operation of presentation system 100 and change which data is executed and/or stored on cloud system 110 and/or one or more communication systems 120. Presentation system 100 may comprise a user-configurable system, such that cloud system 110 administrator may store communication systems data 210, presentation data 212, chat data 214, and/or screenshot data 216 either singularly or redundantly in cloud system 110 database and/or one or more communication systems 120, according to particular needs. According to other embodiments, administration module 202 monitors, processes, updates, creates, and stores communication systems data 210, presentation data 212, chat data 214, and/or screenshot data 216 in cloud system 110 database, as is further discussed below.

According to embodiments, administration module 202 may generate a presentation space, which one or more communication systems 120 may join. When communication system 120 joins the presentation space, administration module 202 may record unique identifying information regarding communication system 120, such as by assigning communication system 120 a unique ID or by recording communication system 120's IP or MAC address, in communication systems data 210.

Graphical user interface module 204 of administrator 112 generates a graphical user interface display comprising and displaying features of communication systems data 210, presentation data 212, chat data 214, and screenshot data 216, such as, for example: generating a visual representation of the presentation space, including presentation display 502 and chat display 602. Graphical user interface module 204 stores and retrieves data from cloud system 110 database including communication systems data 210, presentation data 212, chat data 214, and screenshot data 216. Graphical user interface module 204 may generate different graphical user interface displays conveying different types of information about the presentation space and the presentation and chat displays 602, according to embodiments.

According to embodiments, administration module 202 may access presentation data 212 and coordinate the transmission, by graphical user interface module 204, of presentation data 212, including but not limited to the visual component of the presentation space, to one or more communication systems 120 using network 130 and communication links 140-148 As is further explained below, the visual component may comprise presentation display 502, and/or chat display 602.

Screenshot module 206 of administrator 112 monitors and records screenshot capture commands issued by one or more communication systems 120 participating in the presentation space. According to embodiments, when screenshot module 206 detects that a particular communication system 120 has issued a screenshot capture command, it records the identity of communication system 120 and the time at which communication system 120 issued the screenshot capture command. Screenshot module 206 then stores a captured image of the state of presentation display 502 at the time the command was issued, as well as the identity of communication system 120 which issued the screenshot command, in screenshot data 216.

Figure 3:
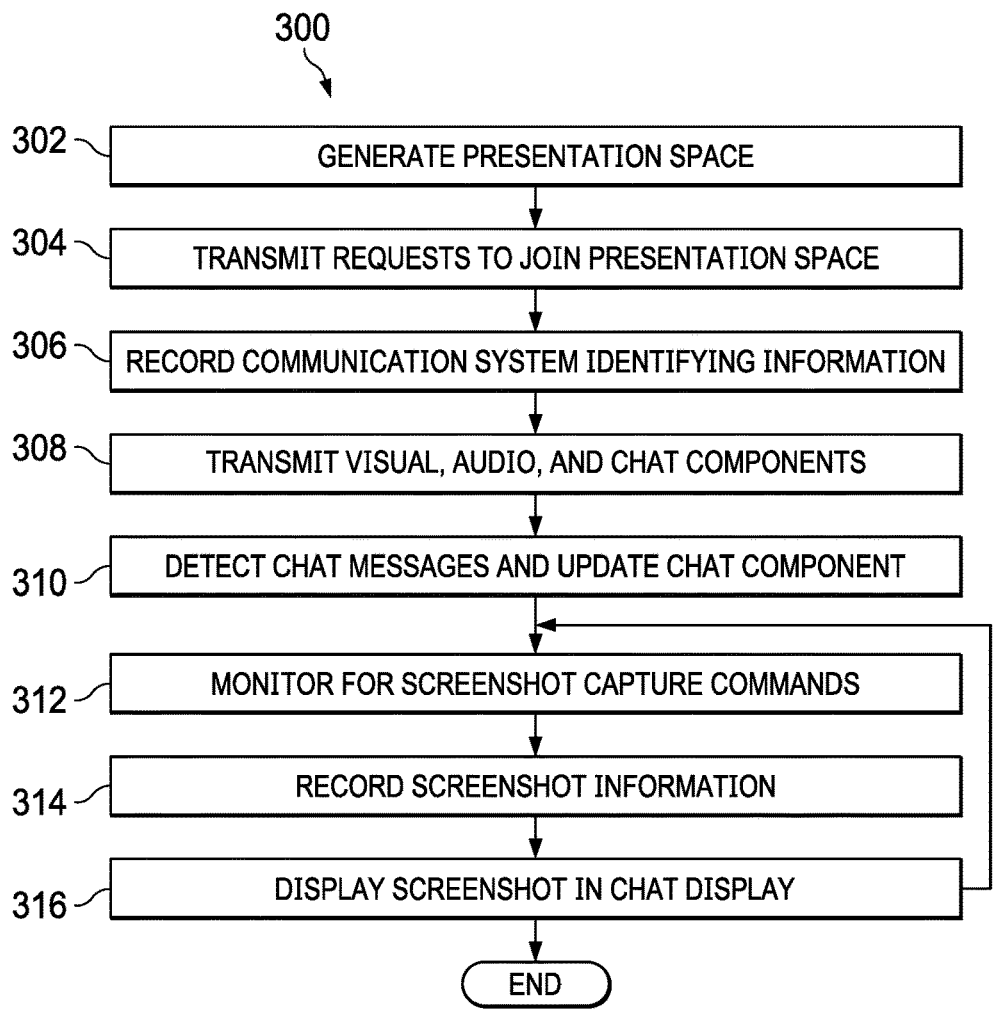
FIG. 3 illustrates an exemplary method of generating a presentation space and capturing, storing, and transmitting screen images, according to an embodiment.

FIG. 3 illustrates exemplary method 300 of generating a presentation space and capturing, storing, and transmitting screen images, according to an embodiment. Method 300 of generating a presentation space and capturing screen images proceeds by one or more actions, which although described in a particular order may be performed in one or more permutations or alternative orders, according to particular needs.

At action 302, administration module 202 generates a presentation space which one or more communication systems 120 may join. In an embodiment, communication system 120 may transmit a request to cloud system 110 over network 130 for cloud system 110 to generate a presentation space. In an embodiment, communication system 120 may additionally transmit to cloud system 110 identifications of other communication systems 120 that cloud system 110 should invite to the presentation space. Administration module 202 of cloud system 110 may store the request to generate a presentation space, and the identifications of other communication systems 120 to be invited to the presentation space, in presentation data 212.

At action 304, administration module 202 transmits, via network 130 and communication links 140-148, requests to join the presentation space to one or more communication systems 120. Administration module 202 accesses presentation data 212 and determines which communication systems 120 are to be invited to the presentation space. For each of the to-be-invited communication systems 120, administration module accesses communication systems data 210, including but not limited to end user ID information, communication system ID information, or communication system MAC address information, for each communication system 120 to be invited to join the presentation space. Administration module 202 transmits, via network 130 and communication links 140-148, requests to join the presentation space to each communication system 120.

At action 306, administration module 202 records in communication systems data 210 unique identifying information regarding each communication system 120 that responds over network 130 to a request to join the presentation space.

At action 308, graphical user interface module 204 transmits, using network 130, the visual component, audio component, and chat component of the presentation space to each of the one or more communication systems 120. Each of the one or more communication systems uses its audiovisual display device to display the visual component, audio component, and chat component of the presentation space in the form of presentation display 502, best illustrated by FIG. 5, and/or chat display 602, best illustrated by FIG. 6. In an embodiment, graphical user interface module continuously transmits the current visual component, audio component, and/or chat component of the presentation space to each of the one or more communication systems 120, enabling one or more communication systems 120 to conduct and/or participate in an ongoing audiovisual presentation.

At action 310, administration module 202 detects chat messages transmitted between communication systems 120 and/or chat messages transmitted from one or more communication systems 120 to cloud system 110. Administration module 202 stores information regarding each chat message in chat data 214. Upon detecting each chat message, administration module 202 automatically updates the chat component to include the new chat message. In an embodiment, graphical user interface module 204 accesses the chat data 214 and the updated chat component stored therein. Graphical user interface module 204 may transmit the updated chat component to each of one or more communication systems 120. One or more communication systems 120 may display updated chat display 602 displaying the new chat message. In an embodiment, administration module 202 monitors presentation system 100 once every second for new chat message transmitted between communication systems 120; in other embodiments, administration module may monitor presentation system 100 for new chat messages substantially continuously, once every five seconds, or at any other interval of time.

At action 312, screenshot module 206 monitors presentation system 100 for screenshot capture commands transmitted by communication systems 120 participating in the presentation space to cloud system 110. In an embodiment, screenshot module 206 monitors presentation system 100 once every second for screenshot capture commands transmitted by communication systems 120; in other embodiments, administration module may monitor presentation system 100 for screenshot capture commands substantially continuously, once every five seconds, or at any other interval of time. In an embodiment, any user of any communication system 120 may transmit a screenshot capture command by actuating, such as by pressing on a touchscreen or clicking with a computer mouse, screenshot capture button 508 displayed on presentation display 502.

At action 314, and in response to detecting a new screenshot capture command, screenshot module 206 records the identifying information of communication system 120 that transmitted the screenshot capture command. In an embodiment, screenshot module 206 records the time at which communication system 120 actuated a screenshot button and/or transmitted a screenshot capture command, and records an image of the state of the video component of the presentation space at the time communication system 120 transmitted the screenshot capture command. Screenshot module 206 stores the recorded information pertaining to the new screenshot capture command in screenshot data 216.

At action 316, administration module 202 accesses the recorded screenshot image stored in screenshot data 216. Graphical user interface module 204 generates updated chat display 602, which now displays the captured image, as well as the identity of communication system 120 which issued the screenshot capture command, as a chat message in chat display 602. Actions 312-316 enable presentation system 100 to allow a particular communication system 120 to take screenshots of presentation display 502 and transmit them to one or more other participating communication systems 120 with a single button actuation. According to embodiments, chat display 602 may display the screenshot images chronologically, with more recent screenshot images visible as chat messages towards the bottom of the chat interface, and older screenshot images displayed above these more recent screenshot images in the chat interface.

Screenshot module 206 now moves to action 312 and continues to monitor presentation system 100 for screenshot capture commands transmitted by communication systems 120 participating in the presentation space to cloud system 110. Presentation system 100 continues to execute actions 312-316 and to detect, record, and transmit screenshot images to one or more communication systems 120. Presentation system 100 then terminates method 300 when the presentation concludes.

To illustrate the operation of presentation system 100 in accordance with method 300, the following example is provided. In this example, presentation system 100 comprises single cloud system 110; exemplary communication systems 120 computer 122, tablet computer 124, smartphone 126, network 130, and communication links 140-146. Although a particular number of cloud systems 110, communication systems 120, users associated with communication systems 120, networks 130, and communication links 140-148 are illustrated and/or described in this example, alternative embodiments contemplate any number of cloud systems 110, communication systems 120, uses associated with communication systems 120, networks 130, or communication links 140-148, according to particular needs.

Continuing the example, each of computer 120, tablet computer 124, and smartphone 126 further comprise an audiovisual recording device (comprising a camera and microphone) and an audiovisual display device (comprising an electronic display screen and one or more speakers). In addition, in this example, a single user, in the form of an individual person, is associated with each of computer 120, tablet computer 124, and smartphone 126.

Figure 4:
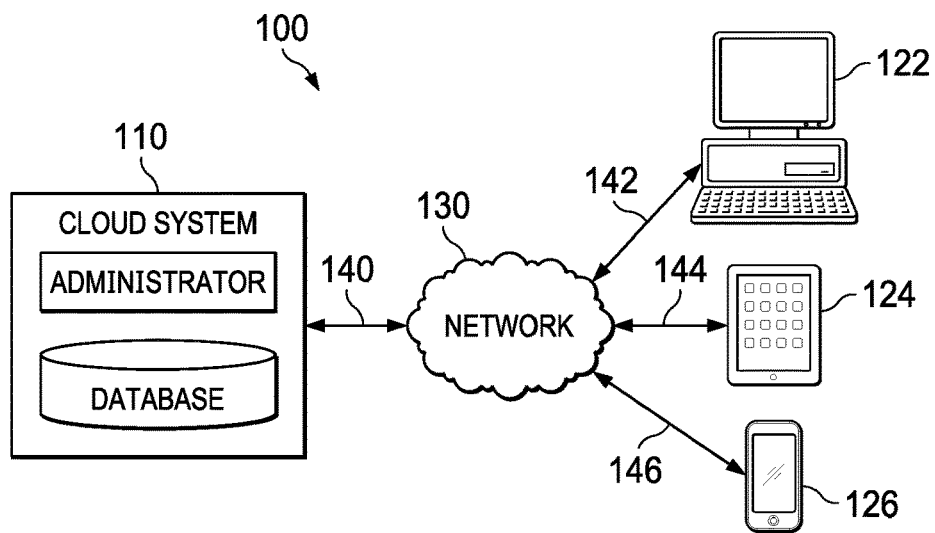
FIG. 4 illustrates an exemplary presentation system with a computer, tablet computer, and smartphone, according to an embodiment.

FIG. 4 illustrates exemplary presentation system 100 with computer 122, tablet computer 124, and smartphone 126, according to an embodiment. Continuing the example, at action 302, computer 122 transmits a request over network 130 to cloud system 110 to generate a presentation space. In this example, computer 122 also transmits to cloud system 110 communication system 120 ID information of tablet computer 124 and smartphone 126 that will be invited to the presentation space. Administration module 202 of cloud system 110 stores the request by computer 122 to generate a presentation space, as well as communication system 120 ID information of tablet computer 124 and smartphone 126 in presentation data 212. Administration module then generates the presentation space.

Continuing the example, at action 304, administration module 202 transmits, via network 130 and communication links 140-146, requests to join the presentation space to computer 122, tablet computer 124, and smartphone 126. Administration module 202 accesses presentation data 212 and determines that computer 122 requested administration module 202 to invite tablet computer 124 and smartphone 126 to the presentation space. Administration module 202 transmits, via network 130 and communication links 140-146, requests to join the presentation space to computer 122, tablet computer 124, and smartphone 126. Computer 122, tablet computer 124, and smartphone 126 join and begin participating in the presentation space. At action 306, administration module 202 records unique identifying information regarding computer 122, tablet computer 124, and smartphone 126 in communication systems data 210.

Continuing the example, at action 308, graphical user interface module 204 transmits, using network 130, the visual component, audio component, and chat component of the presentation space to computer 122, tablet computer 124, and smartphone 126. In this example, the visual component comprises live video images of the user associated with computer 122, recorded by the audiovisual recording device of computer 122 and transmitted by computer 122 to cloud system 110 via network 130 and communication links 140-142. In alternative embodiments, the visual component may comprise information stored in presentation data 212, such as a previously-saved Microsoft PowerPoint slide deck.

Computer 122, tablet computer 124, and smartphone 126 each display the visual component of the presentation space (in this example, live video images of the user associated with computer 122) using the audiovisual display devices associated with each of computer 122, tablet computer 124, and smartphone 126. In this example, each of computer 122, tablet computer 124, and smartphone 126 display the visual component of the presentation space using presentation display 502. Simultaneously, and continuing action 308, administration module 202 detects audio input from the user associated with computer 122, in the form of that user speaking into a microphone associated with computer 122. Administration module 202 transmits, using network 130 and communication links 140-16, computer 122 user's speech (in this example, computer 122 user's speech forms the audio component of the presentation space) to tablet computer 122 and smartphone 124. In this example, administration module 202 combines the visual and audio components of the presentation space into presentation display 502.

Figure 5:
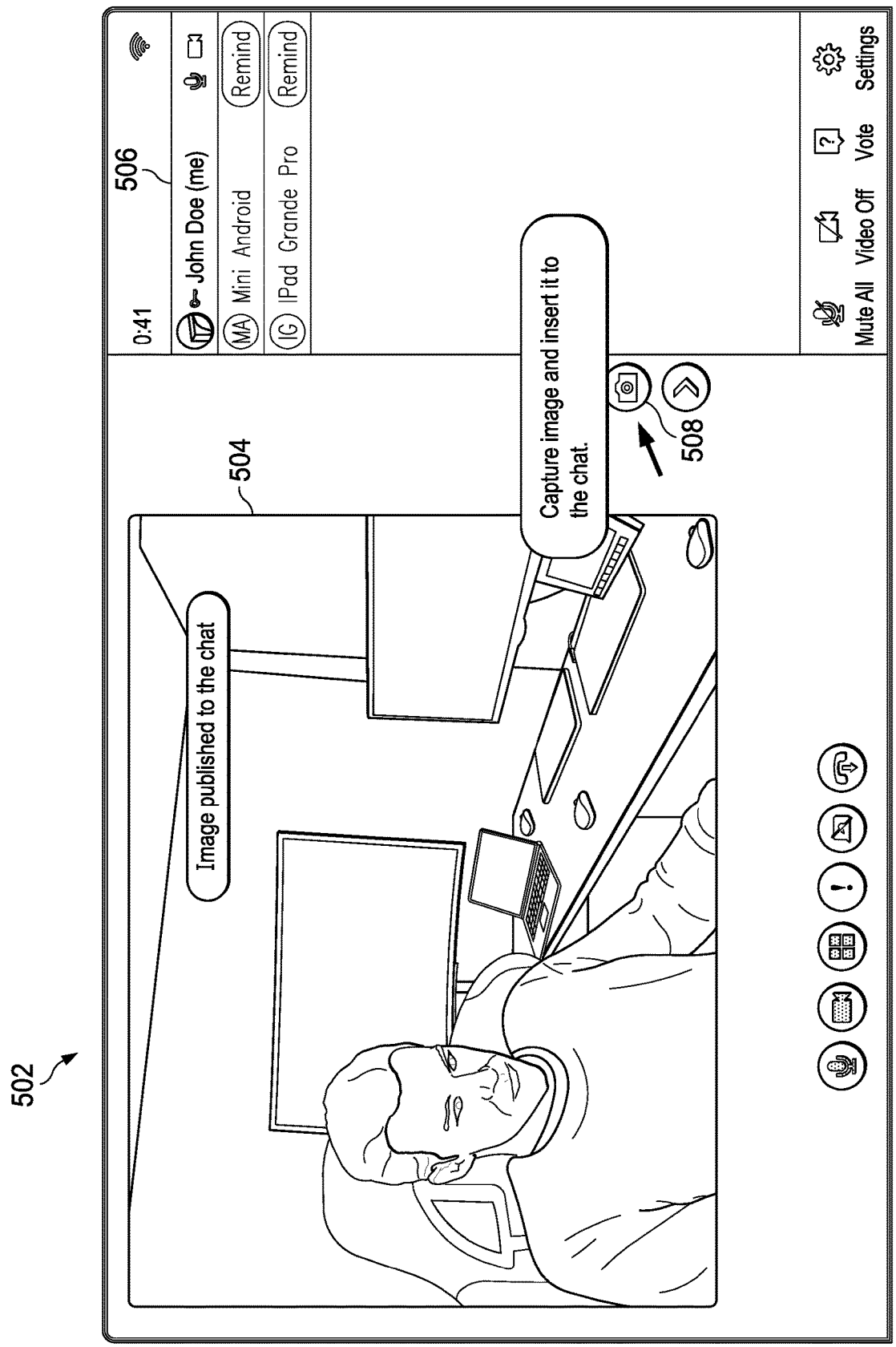
FIG. 5 illustrates an exemplary presentation display, according to an embodiment.

FIG. 5 illustrates exemplary presentation display 502, according to an embodiment. Continuing the example, FIG. 5 illustrates an exemplary embodiment of the visual and audio components of a presentation space, displayed by computer 122, tablet computer 124, and smartphone 126 in the form of presentation display 502. FIG. 5 illustrates exemplary presentation display 502 as each of computer 122, tablet computer 124, and smartphone 126 display presentation display 502 using associated audiovisual display devices. Although FIG. 5 illustrates elements of exemplary presentation display 502 in a particular configuration, embodiments contemplate graphical user interface modules 204 generating presentation displays 502 of any configuration, according to particular needs.

Continuing the above example, the embodiment of presentation display 502 illustrated by FIG. 5 displays presentation window 504, participant panel 506, and screenshot capture button 508. Although FIG. 5 illustrates presentation window 504, participant panel 506, and screenshot capture button 508 in a particular configuration, embodiments contemplate any combination or configuration of presentation windows 504, participant panels 506, screenshot capture buttons 508, and/or other components of presentation display 502, according to particular needs. Presentation window 504, occupying a large area of the central portion of presentation display 502 as illustrated in FIG. 5, displays live video imagery of the user, in this example associated with computer 122, who is giving the presentation. In this example, computer 122 associated with the presenting user utilizes the audiovisual recording device associated with computer 122 to record live video and audio of the user. Computer 122 transmits the live video and audio to cloud system 110 via network 130 and communication links 140-142. In this example, graphical user interface module 204 then generates presentation display 502 which displays the presenting user in presentation window 504. Graphical user interface module 204 transmits presentation display 502 to each of computer 122, tablet computer 124, and smartphone 126.

According to embodiments, participant panel 506 on the right side of presentation display 502 of FIG. 5 displays a visual representation of communication systems 120 currently participating in the presentation space or which have previously participated in a presentation space. Presentation display 502 may identify communication systems 120 by the names of the users associated with the separate communication systems 120, or by identifying communication systems 120 communication devices themselves (such as "Mini Android," "iPad Grande Pro," and the like). In an embodiment, administration module 202 may assign names to the separate communication systems 120 displayed in participant panel 506 using information contained in communication systems data 210. Continuing the above example, participant panel 506 of exemplary presentation display 502 lists the three participating communication systems 120 and the users associated therewith. As described in greater detail below, screenshot capture button 508 allows users to capture presentation space screenshots and share them with communication systems 120 of other users.

Continuing the above example and continuing action 308, as computer 122 user continues the presentation, graphical user interface module 204 simultaneously generates a chat component for computer 122, tablet computer 124, and smartphone 126 to make use of during the presentation. In this example, graphical user interface 204 generates chat display 602, comprising the chat interface which displays any chat messages between computer 122, tablet computer 124, and smartphone 126. Administration module 202 transmits chat display 602, using network 130 and communication links 140-148, to computer 122, tablet computer 124, and smartphone 126. Each of computer 122, tablet computer 124, and smartphone 126 may switch from displaying presentation display 502 to chat display 602, and vice versa, as the presentation continues, without interrupting the audio component playing continuously on computer 122, tablet computer 124, and smartphone 126.

Continuing the example, at action 310, administration module 202 detects chat messages transmitted between tablet computer 124 and smartphone 126. Administration module 202 stores information regarding each chat message in chat data 214. Graphical user interface module 204 accesses chat data 214 and, upon detecting each chat message, automatically updates the chat component and chat display 602 to include the new chat message.

Figure 6:
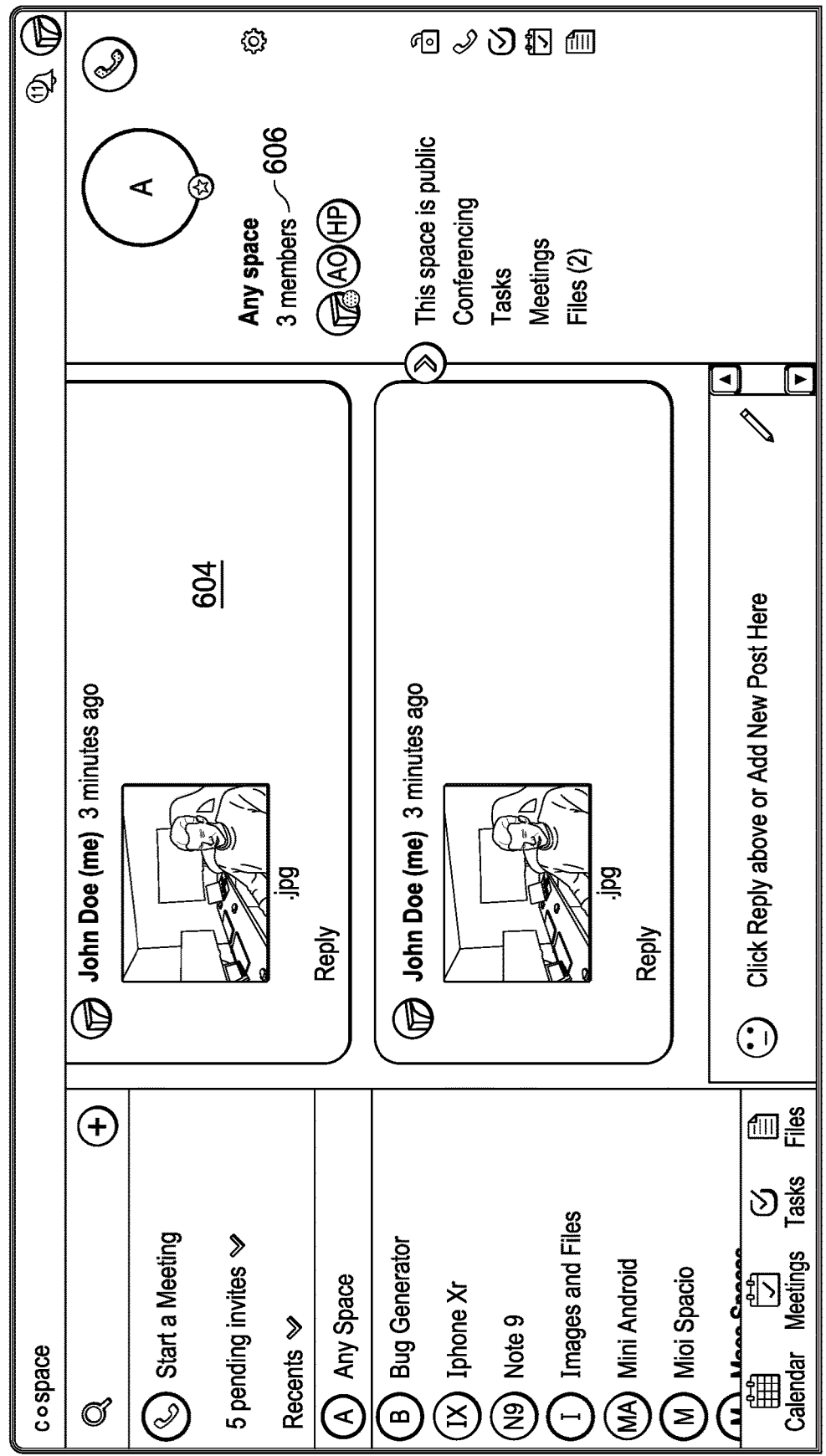
FIG. 6 illustrates an exemplary chat display, according to an embodiment.

FIG. 6 illustrates exemplary chat display 602, according to an embodiment. Continuing the example, FIG. 6 illustrates an exemplary embodiment of the chat component of a particular presentation space, displayed to one or more users of one or more communication systems 120 in the form of chat display 602. According to embodiments, graphical user interface module 204 generates chat display 602, which administration module 202 and/or graphical user interface module 204 transmits to one or more participating communication systems 120 using network 130 and communication links 140-148. FIG. 6 illustrates exemplary chat display 602 as it may appear, according to embodiments, to a user who is using a particular communication system 120 communication device, such as tablet computer 124, to participate in the presentation space and who has selected chat display 602 option instead of presentation display 502 option. In an embodiment, the users associated with each communication system 120, including but not limited to computer 122, tablet computer 124, and/or smartphone 126, may switch back and forth between presentation display 502 and chat display 602 independently of whether other communication systems 120 have selected to display either presentation display 502 or chat display 602.

Continuing the example, chat display 602 displays chat record 604 and participant panel 606. Chat record 604, occupying the majority of the center of chat display 602, permits communication systems 120 to send chat messages to other communication systems 120 participating in the presentation space. According to embodiments, communication systems 120 can choose to send chat messages to every other participating communication system in chat record 604; alternatively, communication systems 120 may pre-select one or more specific communication system recipients before sending chat messages.

According to embodiments, participant panel 606 on the right side of chat display 602 of FIG. 6 displays a visual representation of communication systems 120 currently participating in the presentation space. Chat display 602 may identify these participants by the names of the users associated with the separate communication systems 120, or by identifying communication system 120 communication devices themselves (such as "iPhone XR," "Note 9," and the like). In an embodiment, administration module 202 may assign names to the separate communication systems 120 displayed in participant panel 606 using information contained in communication systems data 210. Chat record 604 may display the names of communication systems 120 participating in the presentation space under, or in association with, each individual chat message displayed in chat record 604.

Continuing the example, at action 312, screenshot module 206 continually monitors for screenshot capture commands issued by communication systems 120 participating in the presentation space. In this example, any user of any communication system 120 may issue a screenshot capture command by pressing the previously-described screenshot capture button, displayed in presentation display 502. In this example and at a particular point in time, screenshot module 206 detects that smartphone 126 user has pressed screenshot capture button 508 on smartphone 126 presentation display 502.

Continuing the example, at action 314, screenshot module 206 records the time at which smartphone 126 actuated screenshot capture button 508, the identifying information of smartphone 126, and an image of the state of presentation window 504 at the time smartphone 126 actuated screenshot capture button 508. Screenshot module 206 stores the time, identifying information, and image in screenshot data 216.

Continuing the example, at action 316, administration module 202 detects the new captured image stored in screenshot data 216. Graphical user interface module 204 updates chat display 602 to display the captured image, as well as the identity of smartphone 126 which actuated screenshot capture button 508, as a chat message in chat record 604. In this way, presentation system 100 supports communication systems 120 taking screenshots of presentation display 502 and transmitting them to the other participating communication systems 120 with a single button press. According to embodiments, chat record 604 may display the screenshot images chronologically, with more recent screenshot images visible as chat messages towards the bottom of chat record 604, and older screenshot images displayed above these more recent screenshot images in chat record 604; other embodiments may display screenshot images in any configuration, or may permit communication systems 120 to scroll through screenshot images in chat record 604 in any order.

Continuing the example, screenshot module 206 returns to action 312 and continues to monitor for subsequent screenshot capture commands issued by each of computer 122, tablet computer 124, and smartphone 126. At a later point in time, during the presentation, tablet computer 124 user presses screenshot capture button 508 displayed on presentation display 502 of tablet computer 124 audiovisual display device. Screenshot module 206 detects this command, records the time at which tablet computer 124 user issued the command, and stores a captured image of the state of presentation display 502 at the time the command was issued, as well as the identity of communication system 120 tablet computer 124, in screenshot data 216. Administration module 202 detects the new captured image stored in screenshot data 216, and graphical user interface module 204 updates chat display 602 to display the captured image, as well as the identity of communication system 120 tablet computer 124 which issued the screenshot command and the time the command was issued, in chat record 604. Users of tablet computer 124 and smartphone 126 may each select chat display 602 as the presentation continues, and may see the new captured image in chat record 604. Concluding the example, computer 122 concludes the presentation, and presentation system 100 terminates method 300.

In other embodiments, administration module 202 may support one or more communication systems 120 and/or one or more users accessing the captured images stored in screenshot data 216 after the presentation concludes and the presentation space is terminated. Administration module 202 may email one or more captured screenshot images to all participating communication systems 120 at the point in time screenshot module 206 records the image, or may instead email the captured screenshot images only to certain preselected communication systems 120, after the presentation concludes and the presentation space is terminated.

Embodiments present communication system 120 users with additional screenshot sharing options and capabilities. For example, embodiments enable users to add text, commentary, and other annotations to captured screenshot images before administration module 202 and graphical user interface module 204 generate and transmit the captured image to other participating communication systems 120. Other embodiments allow users to pre-select certain communication systems 120 to receive captured screenshot images; in this circumstance, administration module 202 and graphical user interface module 204 display the resulting captured image only to pre-selected communication systems 120. Embodiments support chat record 604 users searching the transcript of chat record 604 by timestamp or by text content to locate previous chat messages or captured images. Other embodiments provide a "cooling off" period, such as, for example, thirty seconds, between the initial moment at which communication system 120 user instructs cloud system 110 to capture a screenshot and the point at which cloud system 110 saves the screenshot of the initial moment in database 114. This "cooling off" period permits the user to evaluate the captured screenshot and potentially delete it if the screenshot does not depict the intended subject.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
   two or more communication devices; and
   a cloud system comprising a database and a computer comprising a processor and memory, the cloud system configured to generate a presentation space in which the two or more communication devices participate by:
      generating, by the computer, a presentation space;
      transmitting requests to join the presentation space to the two or more communication devices;
      storing in the database identification information for each of the two or more communication devices;
      transmitting the presentation space to the two or more communication devices;
      detecting chat messages transmitted between the two or more communication devices;
      monitoring, by the computer at an interval of time, the two or more communication devices for screenshot capture commands;
      detecting, by the computer in response to the monitoring, the screenshot capture commands transmitted by one of the two or more communication devices to the cloud system;
      after detecting, by the computer, a screenshot capture command transmitted by one of the two or more communication devices to the cloud system:
         delaying, by the computer, storing of one or more screenshots in the database for a period of time that provides for a user associated with the communication device to evaluate the one or more screenshots;
         deleting, by the computer, the one or more screenshots or storing the one or more screenshots in the database in response to an instruction from a user; and
      displaying, by the computer, one or more screenshots in the presentation space.

2. The system of claim 1, further comprising, after displaying screenshots in the presentation space:
   detecting subsequent chat messages transmitted between the two or more communication devices;
   detecting subsequent screenshot capture commands transmitted by one of the two or more communication devices to the computer;
   recording one or more subsequent screenshots; and
   displaying one or more subsequent screenshots in the presentation space.

3. The system of claim 2, further comprising the computer, after recording one or more subsequent screenshots and before displaying one or more subsequent screenshots in the presentation space:
   annotating the one or more subsequent screenshots with additional text.

4. The system of claim 3, further comprising the computer, after annotating the one or more subsequent screenshots with additional text and before displaying one or more subsequent screenshots in the presentation space:

selecting one of the two or more communication devices to which to display the one or more subsequent screenshots in the presentation space.

5. The system of claim 4, further comprising the computer, after displaying one or more subsequent screenshots in the presentation space:
emailing one or more subsequent screenshots to at least one of the two or more communication devices.

6. The system of claim 1, wherein each of the two or more communication devices comprises a communication device selected from the list of:
a computer;
a tablet computer; and
a smartphone.

7. A computer-implemented method, comprising:
generating, using a cloud system comprising a database and a computer comprising a processor and memory, a presentation space in which two or more communication devices participate;
transmitting requests to join the presentation space to the two or more communication devices;
storing in the database identification information for each of the two or more communication devices;
transmitting the presentation space to the two or more communication devices;
detecting chat messages transmitted between the two or more communication devices;
monitoring, by the computer at an interval of time, the two or more communication devices for screenshot capture commands;
detecting, by the computer in response to the monitoring, the screenshot capture commands transmitted by one of the two or more communication devices to the cloud system;
after detecting, by the computer, a screenshot capture command transmitted by one of the two or more communication devices to the cloud system:
delaying, by the computer, storing of one or more screenshots in the database for a period of time that provides for a user associated with the communication device to evaluate the one or more screenshots;
deleting, by the computer, the one or more screenshots or storing the one or more screenshots in the database in response to an instruction from the user; and
displaying, by the computer, one or more screenshots in the presentation space.

8. The computer-implemented method of claim 7, further comprising, after displaying screenshots in the presentation space:
detecting subsequent chat messages transmitted between the two or more communication devices;
detecting subsequent screenshot capture commands transmitted by one of the two or more communication devices to the computer;
recording one or more subsequent screenshots; and
displaying one or more subsequent screenshots in the presentation space.

9. The computer-implemented method of claim 8, further comprising the computer, after recording one or more subsequent screenshots and before displaying one or more subsequent screenshots in the presentation space:
annotating the one or more subsequent screenshots with additional text.

10. The computer-implemented method of claim 9, further comprising the computer, after annotating the one or more subsequent screenshots with additional text and before displaying one or more subsequent screenshots in the presentation space:
selecting one of the two or more communication devices to which to display the one or more subsequent screenshots in the presentation space.

11. The computer-implemented method of claim 10, further comprising the computer, after displaying one or more subsequent screenshots in the presentation space:
emailing one or more subsequent screenshots to at least one of the two or more communication devices.

12. The computer-implemented method of claim 7, wherein each of the two or more communication devices comprises a communication device selected from the list of:
a computer;
a tablet computer; and
a smartphone.

13. A non-transitory computer-readable storage medium embodied with software, the software when executed configured to:
generate, using a cloud system comprising a database and a computer comprising a processor and memory, a presentation space in which two or more communication devices participate;
transmit requests to join the presentation space to the two or more communication devices;
store in the database identification information for each of the two or more communication devices;
transmit the presentation space to the two or more communication devices;
detect chat messages transmitted between the two or more communication devices;
monitor, by the computer at an interval of time, the two or more communication devices for screenshot capture commands;
detect, by the computer in response to the monitoring, the screenshot capture commands transmitted by one of the two or more communication devices to the cloud system;
after detecting, by the computer, a screenshot capture command transmitted by one of the two or more communication devices to the cloud system:
delay, by the computer, storing of one or more screenshots in the database for a period of time that provides for a user associated with the communication device to evaluate the one or more screenshots;
delete, by the computer, the one or more screenshots or store the one or more screenshots in the database in response to an instruction from the user; and
display, by the computer, one or more screenshots in the presentation space.

14. The non-transitory computer-readable storage medium of claim 13, wherein the software when executed is further configured to, after displaying screenshots in the presentation space:
detect subsequent chat messages transmitted between the two or more communication devices;
detect subsequent screenshot capture commands transmitted by one of the two or more communication devices to the computer;
record one or more subsequent screenshots; and
display one or more subsequent screenshots in the presentation space.

15. The non-transitory computer-readable storage medium of claim 14, wherein the software when executed is further configured to, after recording one or more subsequent screenshots and before displaying one or more subsequent screenshots in the presentation space:
annotate the one or more subsequent screenshots with additional text.

16. The non-transitory computer-readable storage medium of claim 15, wherein the software when executed is further configured to, after annotating the one or more subsequent screenshots with additional text and before displaying one or more subsequent screenshots in the presentation space:
select one of the two or more communication devices to which to display the one or more subsequent screenshots in the presentation space.

17. The non-transitory computer-readable storage medium of claim 16, wherein the software when executed is further configured to, after displaying one or more subsequent screenshots in the presentation space:
emailing one or more subsequent screenshots to at least one of the two or more communication devices.

\* \* \* \* \*